United States Patent Office 3,494,864
Patented Feb. 10, 1970

3,494,864
WATER PURIFICATION PROCESS
Robert A. Willihnganz, 5910 Little Pine Lane,
Rochester, Mich. 48063
No Drawing. Continuation-in-part of application Ser. No.
681,008, Nov. 6, 1967. This application June 16, 1969,
Ser. No. 833,758
Int. Cl. C02b 1/20
U.S. Cl. 210—45        7 Claims

ABSTRACT OF THE DISCLOSURE

An improved process for the removal of water insoluble contaminants from water with the aid of flocculent aluminum hydroxide wherein the improvement comprises treating the slurry of aluminum hydroxide and contaminants, which is formed in this process, with an alkali to dissolve the aluminum hydroxide as a water soluble aluminate salt thereby releasing contaminants for separation and removal, and subsequently adding acid to convert aluminate salt to flocculent aluminum hydroxide for re-use in the process.

---

This application is a continuation in part of application, Ser. No. 681,008, filed Nov. 6, 1967, and now abandoned. It relates to an improvement in the conventional method of removing water insoluble contaminants from water by means of flocculent aluminum hydroxide in the water.

BACKGROUND OF THE INVENTION

The use of flocculent metal hydroxides for the clarification of water containing oil and solid dirt particles is known (U.S. 1,679,777; U.S. 3,347,786). Waste water treating processes employing this principle are in widespread use. Large amounts of oily sludges are produced when these processes are used in the treatment of oily waste waters. The disposal of these oily sludges has presented serious problems. Dumping is not generally permissible. Incineration is expensive and involves problems of air pollution. Acid treatment has serious disadvantages: (1) it frequently results in the formation of invert emulsions which are difficult to break; (2) expensive acid proof treating equipment, tanks, valves, pipes, pumps and stirrers, are required; (3) corrosion and leakage are persistent problems.

The treating process which is the subject of this invention operates primarily in the neutral or alkaline range where corrosion is minimal and acid proof equipment is not required. The principal treating chemical and the oil are completely recovered in the process leaving no oily sludge to be disposed of. Oil is released as a fluid layer which can be separated and reclaimed by conventional means.

SUMMARY OF THE INVENTION

Aluminum hydroxide is commonly employed to remove particulate solids and oily materials from waste waters. The by-product of this treatment, slurries of aluminum hydroxide containing the entrapped particulate solids and oily materials, have presented serious disposal problems.

One object of this invention is to provide for the reclamation and recycling of the aluminum hydroxide in the process thus minimizing the cost of treating chemicals.

A further object of this invention is the separation of the oily materials as an immiscible layer which can be removed readily and reclaimed.

A still further object of this invention is to eliminate, as a by-product of the water treating process, oily slurries which otherwise would present a disposal problem.

A still further objective of this invention is to provide a process which operates primarily in the neutral or alkaline range where corrosion is at a minimum and expensive acid proof equipment is not required.

These objectives are achieved in this invention by adding to the aluminum hydroxide slurry, containing the entrapped particulate solids and oily material, sufficient alkali to convert substantially all of the aluminum hydroxide to a water soluble aluminate salt. This is done preferably at elevated temperatures with agitation. Where the oily materials are primarily petroleum lubricants, hydraulic oils, cutting oils or other unsaponifiable liquids they will form an immiscible layer which separates readily from the aluminate salt solution and can be removed and reclaimed. The particulate solids can normally be removed by sedimentation, centrifuging or filtration. The aluminate salt solution, free of oil and particulate solids, is subsequently recycled in the process, being added to additional contaminated water. The aluminate salt is converted to flocculent aluminum hydroxide by the addition of acid; a slurry of aluminum hydroxide containing entrapped particulate solids and oily material is separated by flotation or sedimentation and is removed. The entire treatment cycle described above is then repeated.

DESCRIPTION OF THE PREFERRED EMBODIMENT

The treatment of oily waste water with aluminum hydroxide is normally preceded by a settling operation in which contaminants which readily float to the top or sink to the bottom are removed.

The remaining water, containing suspended oily materials and particulate solids, is then sampled and checked in laboratory tests to determine the optimum quantities of a water soluble aluminate salt, such as sodium aluminate, and an acid, such as sulfuric acid, required to produce an aluminum hydroxide floc which will achieve the desired removal of particulate solids and oily material. The aluminate salt solution used here is normally material which is recycled in the process.

The amounts of aluminate salt and acid needed for removal of oil and particulate solids, as indicated by these laboratory tests, are added to the water obtained from the settling tank to form aluminum hydroxide floc. Oily materials and particulate solid matter present in the water become entrapped in the aluminum hydroxide floc to form a slurry which tends to float to the surface if the slurry contains oily materials which are less dense than water. The rate of flotation can be increased by providing bubbles of gas in the water. This gas may be air dispersed in the water or air previously dissolved in the water under pressure and released by removal of the pressure. Alternately the gas may be provided by electrolysis of a small portion of the water.

This slurry which separates from the purified water is removed to a separate vessel and allowed to settle further. Any water layer which separates is removed and reprocessed through the process described above. To the remaining slurry sufficient alkali, such as caustic soda, is added to convert all, or substantially all of the aluminum hydroxide to a water soluble aluminate salt. The rate at which this conversion proceeds may be increased substantially with the aid of heat, 170–220° F., and agitation.

The oily materials previously entrapped in the aluminum hydroxide slurry separate as an immiscible layer and are removed. The particulate solid matter in the aluminate salt solution may be separated by settling, centrifuging or filtration and removed. A simple batch process, employing the principles of this invention, is shown in the following example:

To 1,000 gallons of oily waste water, ph 9.0, was added 35 grams of sodium aluminate dissolved in one half gallon of water. The pH of the waste water was then reduced to 7.0 and a tan-white floc of aluminum hydroxide with entrapped oil and dirt particles formed and floated to the surface. After 30 minutes settling a clear water layer was drained off, leaving 30 gallons of slurry containing aluminum hydroxide, oil and dirt particles. After standing for another hour an additional 10 gallons of clear water was drained off. To the remaining 20 gallons of slurry 200 grams of caustic soda was added and the slurry was heated with stirring to 180° F. After 4 hours settling at 180° F. one gallon of oil was removed by skimming. This oil contained less than one percent of water and solids. A small quantity of solid matter settled out of the remaining solution of sodium aluminate and was removed. The remaining solution containing sodiuum aluminate and excess caustic soda was subsequently used to treat a second batch of oily waste water with similar results.

Although the invention has been described in terms of a specific embodiment, it will be understood that various modifications may be made within the scope of the invention. For example where the oily material being removed is heavier than water the slurry of aluminum hydroxide and the oily material will settle to the bottom rather than float to the top. The process may be made continuous rather than batch. Variations may be made, the rate and order of addition of the chemicals, the concentrations of the chemicals, the flow rate of the water, the settling time, etc. without affecting the principle of this invention.

I claim:

1. In a method for purifying water wherein flocculent aluminum hydroxide is provided in the water to remove water insoluble contaminants by entrapment and settling, thus forming a slurry of the aluminum hydroxide and said contaminants, and said slurry is subsequently separated and removed from the purified water, the improvement which comprises adding to said slurry a sufficient quantity of an alkali to convert substantially all of the aluminum hydroxide to a water soluble aluminate salt, separating and removing the water insoluble contaminants from the aluminate salt solution thus formed, and subsequently converting said aluminate salt into flocculent aluminum hydroxide which is recycled in the process.

2. An improved process for removing normally liquid, immiscible, unsaponifiable oily materials, from water with the aid of flocculent aluminum hydroxide in the water, wherein the improvement comprises adding to the slurry of aluminum hydroxide and oily material, which is formed in the process, sufficient alkali to convert substantially all of said aluminum hydroxide into a water soluble aluminate salt and releasing the oily material as an immiscible layer, which is separated and removed, and subsequently reusing said aluminate salt solution in the process by adding sufficient acid to convert said aluminate salt to aluminum hydroxide.

3. The improved process of claim 2 wherein the normally liquid, immiscible, unsaponifiable oily material consists primarily of petroleum oils.

4. The improved process of claim 2 wherein the normally liquid, immiscible, unsaponifiable oily material consists primarily of hydraulic oils or lubricating oils or cutting oils or mixtures of them.

5. The improved process of claim 2 wherein the alkali is caustic soda.

6. The improved process of claim 2 wherein sufficient acid is added to the aluminate salt solution to lower the pH into the range of pH 5.0 to pH 8.5 to precipitate flocculent aluminum hydroxide.

7. The improved process of claim 2 wherein the temperature at which the slurry is treated with an alkali lies in the range of 170–220° F.

References Cited

UNITED STATES PATENTS

| | | | |
|---|---|---|---|
| 1,604,125 | 10/1926 | Kern | 210—47 |
| 3,347,786 | 10/1967 | Baer et al. | 210—45 |

MICHAEL E. ROGERS, Primary Examiner